United States Patent [19]

Adell

[11] Patent Number: 4,753,041

[45] Date of Patent: Jun. 28, 1988

[54] INSULATED METAL EDGE GUARD AND METHOD

[75] Inventor: Robert Adell, Sunnyvale, Tex.

[73] Assignee: U.S. Product Development Company, Sunnyvale, Tex.

[21] Appl. No.: 797,052

[22] Filed: Nov. 12, 1985

[51] Int. Cl.[4] .......................... B60J 5/04; B23P 17/00
[52] U.S. Cl. ...................................... 49/462; 29/527.4; 29/469.5; 293/128; 52/716
[58] Field of Search ............................ 29/469.5, 527.4; 49/462; 52/716; 156/200, 222; 428/31, 122; 293/128

[56] References Cited

U.S. PATENT DOCUMENTS

| 4,163,076 | 7/1979 | Katoh | 428/122 X |
| 4,338,148 | 7/1982 | Adell | 49/462 X |
| 4,437,916 | 3/1984 | Adell | 49/462 X |
| 4,457,112 | 7/1984 | Adell | 49/462 |
| 4,555,870 | 12/1985 | McKinnon et al. | 49/462 |
| 4,575,147 | 3/1986 | Ui et al. | 49/462 X |

Primary Examiner—Howard N. Goldberg
Assistant Examiner—Carl J. Arbes
Attorney, Agent, or Firm—Rhodes and Boller

[57] ABSTRACT

An insulated metal edge guard of generally U-shaped cross section is provided with beads at the distal ends of the legs. In order to achieve metal-to-metal contact in the formation of the beads insulating material on one surface of the flat metal strip from which the edge guard is formed is omitted along the margins of the strip and the margins are sufficiently wide to guarantee that there will be metal-to-metal contact when the beads are formed. This leaves exposed metal which is covered by applying a further insulating material. Various color combinations are possible and the exterior surface of the edge guard can present a color coordinated appearance while being fully insulated so that underlying metal is not exposed.

16 Claims, 1 Drawing Sheet

INSULATED METAL EDGE GUARD AND METHOD

BACKGROUND AND SUMMARY OF THE INVENTION

This invention relates to insulated metal edge guards of the type applied to the trailing edges of swinging closures. When applied to the trailing edges of automobile doors these edge guards are referred to as door edge guards.

Inventions of the applicant related to this subject and already patented are identified by the following U.S. Pat. Nos. Des. 275,945; 4,377,056; 4,457,112; 4,259,812; 4,379,376; 4,489,519; 4,271,633; 4,379,377; 4,499,689; 4,316,348; 4,387,125; 4,520,593; 4,334,700; 4,429,013; 4,520,594; 4,338,148; 4,434,598; 4,547,994; 4,365,450; 4,437,916. There are also additional patent applications pending which are known to the U.S. Patent and Trademark Office by virtue of their pendency.

Certain of applicant's inventions comprise edge guards in which the distal ends of the legs are reverse turned to form beads. Applicant has also originated insulated metal door edge guards which have non-metallic material on the exterior which is intended to color coordinate with the color of an automobile. Applicant has also originated procedures for the efficient manufacture of high quality insulated metal door edge guards such as extruding plastic onto a flat metal strip, and then forming the insulated strip material into the desired shape.

For certain uses of door edge guards of the insulated metal type originated by the applicant, it has been found to be important to provide a metal-to-metal contact when the distal ends of the legs are reverse turned to form beads. In other words if there is insulating material in those areas of the flat metal strip where the beads are reversed, the presence of insulating material may preclude the attainment of metal-to-metal contact. The attainment of metal-to-metal contact can be important for more precise control and for improved retention force, among other reasons.

Accordingly the desire to achieve color coordination of the exterior of the edge guard with the door may have to be compromised. In other words where a color coordination of the edge guard's exterior is required so that the underlying metal of the edge guard is covered, at least where the edge guard is visible from the exterior, and where a bead having metal-to-metal contact is desired, it can be difficult to utilize an extrusion process for fabricating purpose while still assuring attainment of the desired objectives.

The present invention provides a solution to this problem. Briefly the invention comprises applying insulating material to one side of the flat metal strip so that in the finished edge guard that insulation will fully line the interior of the U-shaped cross section to insulate the metal of the edge guard from the metal of the door edge and so that when a bead is formed at the distal end of the exterior, or outside, leg, the insulating material which has been applied to that one side of the metal strip will wrap around the bead to form a band of material running along the length of the edge guard on the exterior of the distal end of the exterior leg.

A second layer of insulating material is also applied to the opposite side of the strip such that in the finished edge guard that second layer of insulating material covers only a portion of the exterior of the outer leg, stopping short of the bead. This leaves an uncovered metal portion on the exterior of the outer leg between the first layer of insulating material and the second layer of insulating material. It is in this region that a third application of insulating material is made to extend between the terminations of the first two mentioned insulating layers and cover the otherwise exposed metal existing between the two terminations. This third insulating material covers the edge of the metal strip which forms the end of the reverse-turned bead and it also covers metal existing on the exterior surface of the outer leg proximal of the bead. If the first layer does not extend on the first surface to the edge of the strip, then the third insulating material can also cover any exposed portion of the metal of the bead which lies marginal to the edge of the strip.

Various colors may be imparted to the insulating materials to provide selective coloration. A unitary color is achieved by having all three insulating materials of the same color or there may be a combination of different colors resulting in different decorative effects.

Where the interior leg of the edge guard is also formed with a bead in the same way by reverse turning the outer margin of the strip back onto itself, the material applied to form the third insulation on the interior leg may comprise a light reflective medium, such as embedded metal fragments or glass beads, whereby when the door is opened and incident light from the rear strikes the third material it presents an internal reflection of light back in the direction of the incident light. For example this can promote nighttime safety when the door is open and there is a vehicle approaching from the rear.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
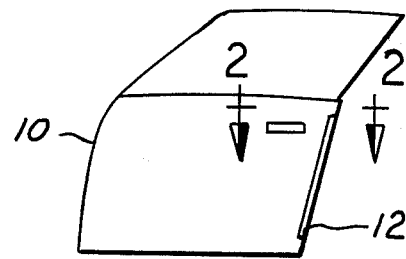
FIG. 1 is a partial side elevational view of a door having a trailing edge containing an edge guard embodying principles of the present invention.

FIG. 1 shows an automobile door 10 whose trailing edge contains an insulated metal edge guard 12 embodying principles of the present invention. The preferred embodiment of insulated metal edge guard is one which is of the self-retaining type wherein the use of separate fasteners or other means of attachment are not required.

The illustration of FIG. 1 is merely exemplary, and it will be appreciated that any given embodiment of edge guard 12 will be required to conform to the particular contour, shape, and thickness of the particular door trailing edge on which it is used.

Figure 2:
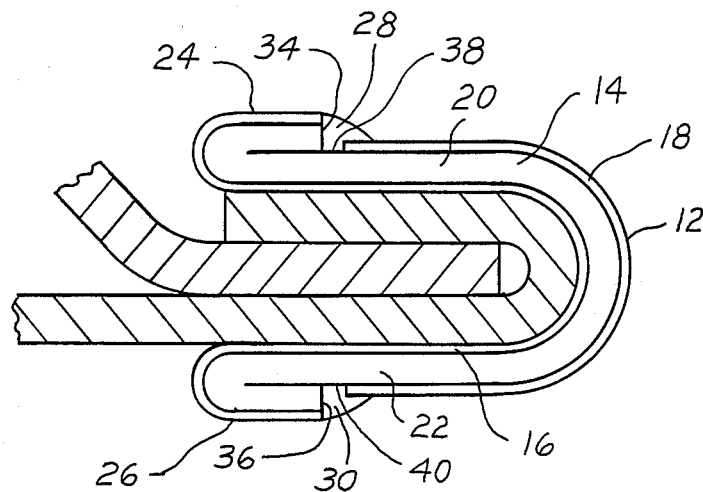
FIG. 2 is an enlarged transverse cross sectional view taken in the direction of arrows 2—2 in FIG. 1.

Looking at FIG. 2 it can be seen that the insulated metal edge guard 12 comprises a U-shaped metal channel 14 which contains a first insulating material layer 16 and a second insulating material layer 18. The edge guard has a generally U-shaped cross section, by way of example, and the layer 16 lines the full extent of the interior of the U-shaped cross section while the layer 18 lines a portion of the exterior of the U-shaped cross section.

In addition to fully covering the interior of the U-shaped cross section, layer 16 also extends around the distal ends of the inner and outer legs 20 and 22 respectively because of the formation of beads 24, 26 respectively at the distal ends of the two legs. The beads are formed by reverse-turning the distal end margins of the legs outwardly back against themselves. It is to be observed that the insulating material 18 stops short of the beads so that the immediately adjacent portion of the exterior of the metal 14 immediately adjacent the beads is free of both insulating materials 16, 18. It is over this region that a third insulating material 28 and 30 respectively is applied.

As shown in FIG. 2 these third insulating materials 28 and 30 cover what would otherwise be exposed metal existing both at the edges 34 and 36 and the immediately contiguous uncovered surface portions 38 and 40. An example of a suitable material for the non-metallic layers 16, 18, 28 and 30 is vinyl plastic. By providing the same coloration to all three, a uniform color appearance may be imparted. However it is possible to provide selective coloration by providing different colors.

Since it will be the outer leg 22 which is presented on the exterior of the vehicle with the door closed, the making of the three layers 16, 18, 30 of three distinct colors will provide two color marginal bands running lengthwise of the edge guard at the distal end of its outer leg. By making material 16 and 18 the same color and material 30 of a different color a different colored band will be provided running along the length of the edge guard where the material 30 is applied. As can be appreciated a variety of color combinations are possible and can be made to match or coordinate with the color of door 10.

Figure 3:
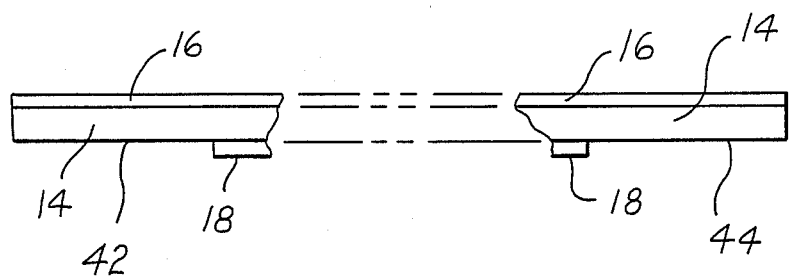
FIG. 3 is a transverse cross sectional view during the method of fabrication and this Figure is useful in explaining principles of the invention.

FIG. 3 is useful in explaining the method for fabricating the edge guard of FIGS. 1 and 2. The metal 14 is initially a flat metal strip and the preferred procedure is to extrude or co-extrude the two layers 16, 18 onto opposite sides. As noted the layer 16 may apply to the full extent of one side. The other layer 18 is however limited to a central region of the metal strip so as to leave the marginal edge portions 42, 44 of the metal strip on that side free of any insulating material. It is also desired to leave the edges 34, 36 free of insulating material as well. The widths of the free areas 42, 44 are shown such that when the side marginal edges of the strip are reverse turned to form the beads, the formation of the beads results in metal-to-metal contact and the beads do not contact the insulating material 18. This assures the closed formation of the beads and resulting metal-to-metal contact. Once the edge guard has been formed into the beaded U-shaped cross section, the third materials are applied, for example by extruding process. In covering the otherwise exposed metal the third layer will come into contact with and may even overlap to some extent the other insulating layers.

In the case of the inner leg of the edge guard which is typically not seen when the door is closed but becomes visible when the door is open, a useful procedure is to incorporate a light reflective medium into the third layer 28. This can be done by tiny glass beads, metal flakes or the like. When the door is open and a light is incident on the door from the rear, the light reflective means in the third layer will reflect light back in the direction of its incidence. This can provide a night-time safety feature when the door is open when there is a vehicle approaching from the rear with its headlights on.

While a preferred embodiment of the invention has been disclosed, it will be appreciated that principles are applicable to other embodiments.

What is claimed is:

1. In an insulated metal edge guard of generally U-shaped cross section comprising insulating material applied to opposite sides of a flat metal strip which is formed into a generally U-shaped cross section having inner and outer legs with a bead formed at the distal end of at least one of the legs by reverse turning the end of the one leg back against itself, the improvement which comprises the insulating material which is applied to one side of the metal strip being disposed such that such insulating material lines one of the interior and the exterior of the U-shaped cross section, including that side of the bead which is on said one of the interior and the exterior of the U-shaped cross section, extends around the beaded distal end of said one leg, and lines the bead on the other of the interior and exterior of the U-shaped cross section; the insulating material which is applied to the other surface of the metal strip being disposed such that said one leg on said other of the interior and exterior of the cross section terminates distally short of the beaded distal end of said one leg such that there is a gap in the insulating material where the metal of said strip is exposed immediately proximal of the beaded distal end of said one leg on said other of the interior and exterior of the cross section and such that the bead possesses metal-to-metal contact by reverse turning the end of said one leg back against itself; and including further insulating material disposed as a discrete filler to fill said gap and cover the exposed metal.

2. In the method of making an insulated metal edge guard of generally U-shaped cross section by applying insulating material to opposite sides of a flat metal strip and then forming the flat metal strip with the insulating material thereon into a generally U-shaped cross section having inner and outer legs including the forming of a bead at the distal end of at least one of the legs by reverse turning the end of the one leg back against itself, the improvement which comprises: applying the insulating material to one side of the metal strip prior to the steps of forming the strip into generally U-shaped cross section and of forming said bead such that after the U-shaped cross section and bead have been formed, such insulating material covers the side of said bead which is on the interior of the U-shaped cross section, extends around the distal end of said bead, and covers the side of said bead which is on the exterior of the U-shaped cross section; applying insulating material to the other surface of the metal strip prior to the steps of forming the strip into generally U-shaped cross section and of forming said bead such that after the steps of forming the strip into generally U-shaped cross section and of forming said bead, such insulating material is disposed along said one leg on one of the exterior and the interior of the U-shaped cross section but terminates distally short of the beaded distal end of said one leg such that there is a gap in the insulating material where the metal of said strip is exposed immediately proximal of the beaded distal end of said one leg on said one of the exterior and interior of the U-shaped cross section; and after the beaded distal end of said one leg has been formed, including the further step of applying further insulating material to said one leg on said one of the exterior and the interior of the U-shaped cross section to fill said gap and cover the exposed metal.

3. In the method of making an insulated metal edge guard of generally U-shaped cross section by applying insulating material to opposite sides of a flat metal strip and then forming the flat metal strip with the insulating material thereon into a generally U-shaped cross section having inner and outer legs including the forming of a bead at the distal end of at least one of the legs by reverse turning the end of the one leg outwardly back against itself, the improvement which comprises: applying the insulating material to one side of the metal strip prior to the steps of forming the strip into generally U-shaped cross section and of forming said bead such that after the U-shaped cross section and bead have been formed, such insulating material lines the interior of the U-shaped cross section, extends around the beaded distal end of said one leg, and is disposed on the exterior of the U-shaped cross section; applying insulating material to the other surface of the metal strip prior to the steps of forming the strip into generally U-shaped cross section and of forming said bead such that after the steps of forming the strip into generally U-shaped cross section and of forming said bead, such insulating material is disposed on the exterior of the U-shaped cross section along said one leg but terminates distally short of the beaded distal end of said one leg such that there is a gap in the insulating material where the metal of said strip is exposed immediately proximal of the beaded distal end of said one leg, and such that the bead possesses metal-to-metal contact by reverse turning the end of said one leg outwardly back against itself; and after the beaded distal end of said one leg has been formed, including the further step of applying further insulating material to the exterior of the U-shaped cross section to fill said gap and cover the exposed metal.

4. The improvement set forth in claim 3 in which the further step of applying further insulating material to the exterior of the U-shaped cross section to fill said gap and cover the exposed metal comprises overlapping the further insulating material with at least a portion of the other insulating material.

5. The method set forth in claim 3 in which the color of said further insulating material differs from the color of the other insulating material.

6. The improvement set forth in claim 3 in which the first two applying steps are performed to include the other leg, as well as the one leg, such that after the recited forming steps, the bead at the other of said legs corresponds to that at said one leg in that there is a gap in insulating material where the metal of said strip is exposed immediately proximal the beaded distal end of said other leg; and further including the step of applying additional insulating material to the exterior of the U-shaped cross section to fill the last-mentioned gap and cover the exposed metal.

7. The method set forth in claim 6 in which the step of applying said additional insulating material to cover the last-mentioned gap comprises applying with said additional insulating material a light reflective medium so that the additional insulating material has a light reflective characteristic.

8. The improvement set forth in claim 3 in which the insulating material applied to said one side of the flat metal strip is of a different color from that applied to the other side of the flat metal strip.

9. The improvement set forth in claim 8 in which said further insulating material has a color characteristic different from both the insulating material applied to the one side of the flat metal strip and the insulating material applied to the opposite side of the flat metal strip.

10. An edge guard made by the method of claim 3.
11. An edge guard made by the method of claim 4.
12. An edge guard made by the method of claim 5.
13. An edge guard made by the method of claim 6.
14. An edge guard made by the method of claim 7.
15. An edge guard made by the method of claim 8.
16. An edge guard made by the method of claim 9.

* * * * *